United States Patent [19]

Umeda et al.

[11] Patent Number: 4,528,692

[45] Date of Patent: Jul. 9, 1985

[54] CHARACTER SEGMENTING APPARATUS FOR OPTICAL CHARACTER RECOGNITION

[75] Inventors: Tetsuo Umeda; Kazunari Egami; Naoto Tsukakoshi; Yasuo Nishijima, all of Tokyo, Japan

[73] Assignee: Nippon Electric Co., Ltd., Tokyo, Japan

[21] Appl. No.: 352,633

[22] Filed: Feb. 26, 1982

[30] Foreign Application Priority Data

Feb. 26, 1981 [JP] Japan ................. 56-27512

[51] Int. Cl.$^3$ .................... G06K 9/34; G06K 9/36
[52] U.S. Cl. .................... 382/9; 382/56; 382/48
[58] Field of Search ............. 382/9, 41, 44, 56, 48, 382/22; 358/260, 261, 262

[56] References Cited

U.S. PATENT DOCUMENTS

| | | | |
|---|---|---|---|
| 3,916,095 | 10/1975 | Weber et al. | 358/261 |
| 3,992,697 | 11/1976 | Knab et al. | 382/48 |
| 4,251,799 | 2/1981 | Jih | 382/42 |
| 4,345,245 | 8/1982 | Vella et al. | 382/45 |
| 4,410,916 | 10/1983 | Pratt et al. | 358/261 |

*Primary Examiner*—John C. Martin
*Assistant Examiner*—Michael D. Parker
*Attorney, Agent, or Firm*—Laff, Whitesel, Conte & Saret

[57] ABSTRACT

A character segmenting apparatus has an optical scanner for scanning the surface of an article of mail. The scan is in a direction which is substantially perpendicular to the direction of the relative movement between the optical scanner and the mail article. The scan generates a pattern signal which is then recurrsively compressed and updated in the width of a black picture element contained in the pattern signal. A character segmenting signal is produced when no black picture element exists in a portion of the pattern signal, delivered from the optical scanner, which corresponds to the black picture element contained in the compressed pattern signal. Size and position information of a whole segmented character is developed in response to the character segmenting signal.

4 Claims, 8 Drawing Figures

| | $M_1$ | | $M_2$ | | |
|---|---|---|---|---|---|
| L1 | $W_0$ | 1 | | | $(W_0)$: NEW REGISTRATION |
| L2 | $R_0$ | 1 → | $W_0$ | 2 | $(W_0) = (R_0) + 1$ |
| | | | $W_1$ | 1 | $(W_1)$: NEW REGISTRATION |
| L3 | $W_0$ | 3 ← | $R_0$ | 2 | $(W_0) = (R_0) + 1$ |
| | $W_1$ | 2 | $R_1$ | 1 | $(W_1) = (R_1) + 1$ |
| L4 | $R_0$ | 3 → | $W_0$ | 4 | $(W_0) = (R_0) + 1$ |
| | $R_1$ | 2 | $W_1$ | 1 | $(W_1) = (R_1) + 1$ |
| L5 | $W_0$ | 5F ← | $R_0$ | 4 | F: SEGMENTING CHARACTER $\{W=4, X=5, H=6, Y=7\}$ |
| | $W_1$ | 2 | $R_1$ | 1 | $(W_1) = (R_1) + 1$ |
| L6 | $R_0$ | 5F → | $W_0$ | 1 | $(W_0)(W_1)$: NEW REGISTRATION |
| | | | $W_1$ | 1 | $(W_2) = (R_1) + 1$ |
| | $R_1$ | 2 | $W_2$ | 3 | F of $(R_0)$: ERASING SEGMENTED BLOCK |
| L7 | $W_0$ | 2 ← | $R_0$ | 1 | $(W_0) = (R_0) + 1$ |
| | $W_1$ | 4 | $R_1$ | 1 | $(W_1)$ = GREATER ONE of $(R_1)$ & $(R_2) + 1$ |
| | | | $R_2$ | 3 | |
| L8 | $R_0$ | 2 → | $W_0$ | 3 | $(W_0) = (R_0) + 1$ |
| | $R_1$ | 4 | $W_1$ | 5F | F: SEGMENTING CHARACTER $\{W=4, X=8, H=5, Y=11\}$ |
| L9 | $W_0$ | 4F ← | $R_0$ | 3 | F: SEGMENTING CHARACTER $\{W=3, X=9, H=4, Y=5\}$ |
| | | | $R_1$ | 5F | F of $(R_1)$: ERASING SEGMENTED BLOCK |
| L10 | $R_0$ | 4F | | | F of $(R_0)$: ERASING SEGMENTED BLOCK |

FIG. 7

CHARACTER SEGMENTING APPARATUS FOR OPTICAL CHARACTER RECOGNITION

BACKGROUND OF THE INVENTION

This invention relates to an optical character recognition system and, more particularly, to a character segmenting apparatus for segmenting characters, one by one, from an input pattern delivered from an optical scanner.

The character segmenting apparatus assumes a circumscribing square for each character, in a two-dimensional pattern, which is binary-coded and delivered from the optical scanner. The character is segmented on the assumption that the entire perimeter of its circumscribing square is white or blank by at least one mesh (one bit). The position and size information of the character is thus extracted for the entire scanning field. In the case of an article of mail, for example, the address and postal code number are primarily described on the mail article. However, the heights of characters range from about one milimeter to about ten milimeters and also the pitches between them are non-uniform. Character segmenting is extremely effective in such a case.

In a character reading operation, in general, usually only several specific lines are to be read among a large number of character lines. Character segmentation is specifically effective especially when the positions of characters and lines are non-uniform or when the number of characters to be read varies among the objects to be processed.

The prior art character segmenting methods can be broadly classified into a "compressing method" and a "masking method". In accordance with the compressing method, full character patterns are compressed in the transverse direction while being written into a memory in order to segment each line from the full patterns containing a plurality of lines. Then, compression is performed in the longitudinal direction, while the patterns of one stored line are read-out of memory. By using such compression in the two directions, each character can be segmented individually. Especially when the pitch of all characters is constant and the character assignment in the line is uniform throughout all lines, the sequence of compression may be reversed.

However, this prior art compressing method has the following drawbacks. First, a processing time of at least twice the scanning time is necessary for character segmenting. If the number of lines to be read by one scanning is great, the time for segmenting increases in proportion to the number of lines. Second, segmentation of the character lines from data compressed about the transverse direction becomes impossible, if the assignment of character lines are complicated, i.e., the spaces between the adjacent lines are relatively small and the character lines are skewed as a whole. In such a case, the compression processing must be carried out separately in the transverse direction and hence, the processing time becomes longer as much.

Another prior art method, i.e., "masking method", will be described next. The prior art masking method can be further classified into two methods. The first masking method directly detects that the entire circumference outside the aforementioned circumscribing square is white. A two-dimensional shift register is prepared which has a capacity that is greater than at least the maximal width of the characters to be processed. Then, the pattern signal delivered from an optical scanner is applied to this shift register. A white frame detection mask detects a condition wherein the entire circumference outside the circumscribing square of the character is white. The white frame detection mask is provided in the shift register in order to detect the presence or absence of a white frame outside the character. The detection is made in response to the character data stored in the shift register. If the pattern corresponding to the white frame is all indicative of a blank space, the character segmentation is detected. The second masking method uses a part of the upper left and a part of the lower right of the white frame to partially segment characters and thereafter synthesizes them to segment each character perfectly.

However, the first and second masking methods have the following problems. In the first method, the size of the character that can be detected is limited by the one mask of a given size. Hence, a plurality of masks, having varying sizes, must be prepared in order to segment characters having varying sizes, thus making the mask circuit construction complicated. Further, the address or postal code numbers on the mail article frequently have a low print quality. For example, there may be a partial blurring of the characters and consecutive printing or over printing of two or more characters. It is practically impossible to prepare masks to cover all of these cases. To solve these problems, this method must be employed jointly with other auxiliary methods such as the partial compressing method, resulting in an increase in the processing time.

The second method involves the following problems. Since this method is developed in order to solve the problems with the first masking method, it can cope with the variation of the character sizes and the blur and consecution or overstrike of the characters. However, because the detected data from each mask is produced in disorder with respect to time, a complicated algorithm is required in order to later segment each character from these data, by a calculation. Hence, a prolonged processing time is necessary.

SUMMARY OF THE INVENTION

It is, therefore, an object of the present invention to provide a character segmenting apparatus which is capable of providing size and position information of a segmented character simultaneously with a completion of a scanning for a mail article.

It is another object of the present invention to provide a character segmenting apparatus which is capable of segmenting all characters contained in the whole scanning field in which a character to be segmented covers a character of one-mesh up to a character corresponding to the whole scanning field.

According to the present invention, a character segmenting apparatus comprises an optical scanner for scanning a surface of an article of mail in the direction which is substantially perpendicular to the direction of the relative movement between the optical scanner and the mail article. A pattern signal is generated responsive to the scan. The resulting pattern signal is recursively compressed in the direction of the relative movement between the optical scanner and the mail article. The width of the block contained in the pattern signal is updated in response to the operation of the compression. A character segmenting signal is produced when no block exists in a portion of the pattern signal delivered from the optical scanner, which portion corresponds to a block in an added pattern signal between the compressed pattern signal and the pattern signal from the optical scanner. Size and position information is developed relative to the block, in response to the character segmenting signal.

Describing in detail, a character segmenting apparatus according to the present invention comprises an optical scanner for scanning a surface on a mail article. The scan is in the direction which is substantially perpendicular to the direction of the relative movement between the optical scanner and the mail article. A register has a capacity corresponding to one scanning line as scanned by the optical scanner for recursively compressing the pattern signal delivered from the optical scanner. The compression occurs in the direction of the relative movement between the optical scanner and the mail article. A character is segmented when no block exists in a portion of the pattern signal delivered from the optical scanner, which portion corresponds to a block in the added pattern signal between the compressed pattern signal delivered from the register and the pattern signal delivered from the optical scanner. The width of the block contained in the pattern signal is updated. A height counting means counts the height of the block in the compressed pattern signal. A first position counting means counts the scanning lines, and second position counting means, counts the clock pulses used in the optical scanner for scanning. Values are set responsive to signals delivered from the updating means, the height counting means, the first position counting means and the second position counting means, in response to the character segmenting signal. The block segmented by the segmenting means (a whole segmented character) is erased from the compressed pattern signal delivered from the register.

BRIEF DESCRIPTION OF THE DRAWINGS

FIG. 1(b) shows an example which cannot hardly be segmented by a prior art structure;

FIG. 7 is a table showing a change in a value stored in memories shown in FIG. 5.

In FIG. 1(a), characters are shown with a constant pitch and the character lines are not skewed. Therefore, each line can be segmented by the compression in the horizontal direction (X-direction). After the line segmentation, each character of one line can be segmented by the compression in the vertical direction (Y-direction). However, if characters are written at random, as shown in FIG. 1(b), characters can not be segmented by the compression method.

FIG. 2 illustrates an example of a character pattern to be segmented according to the present invention. This pattern consists of 10 meshes in the X-direction and 12 meshes in the Y-direction. The pattern contains the characters (5), (7), and (1). Processing or scanning for the character segmentation, according to the present invention, proceeds from the bottom to the top and from the left to the right and the data are compressed in the transverse direction (the X-direction). Of course, this process is carried out simultaneously with the scanning of a mail article. A transition of the compressed pattern is shown in FIG. 3. The height of the block in the compressed pattern, i.e. (the height of the compressed block for each character) increases as the process proceeds from left to right. According to the present invention, the character segmentation is based upon the condition that a block exists in an added pattern between the compressed pattern and the pattern of the subsequent scanning line and that no block exists at all in the subsequent scanning line within the portion corresponding to the block in the added pattern. Further, both the size information and the position information of the segmented character are simultaneously extracted. In the case of the character (5), for instance, the size informations H(=6) and W(=4) are extracted for the height and width. As to the position of this character, the position of the right shoulder of this character is extracted, i.e., (X, Y) (=(5, 7)). Meshes $P_5$, $P_7$ and $P_1$ in FIG. 3 represent the positions of the characters (5), (7) and (1), respectively.

Next, the present invention will be described in detail with reference to drawings illustrating an embodiment thereof. FIGS. 4 and 5 illustrate a part of an embodiment of the present invention. Referring initially to FIG. 4, an input binary pattern signal a is delivered from a scanner 1 and is transmitted to a compression shift register 11, via an OR gate 10. The shift register 11 has a bit capacity equal to the number of meshes corresponding to one Y-direction line. Through the OR gate 10, the shift register 11 receives the input pattern signal a and a signal s. The signal delivered from the OR gate 10 is defined as an added pattern signal t. The signal s is delivered from an AND gate 12 and is and ANDed output between an inhibiting signal b and a compressed pattern signal r, which is delivered from the shift register 11. The inhibiting signal b indicates a signal corresponding to a whole segmented character which is previously detected and segmented. Therefore, the inhibiting signal b is delivered when character segmentation is performed during a previous scanning. When the inhibiting signal b is "1" (i.e., the entire segmented character was not detected previously) the register 11 compresses the input pattern signal a in the X-direction through the AND gate 12 and the OR gate 10 by recursively receiving the input pattern signal a. The inhibiting signal b and the signal s are hereinafter used to indicate an erasing signal b and a remaining signal s, respectively. One-bit registers 20, 21, 30, 31, 40, 41 and 45 are provided in order to adjust the timing of each signal. The shift operation of all registers is controlled by a shift clock pulse SH.

Figure 1A:
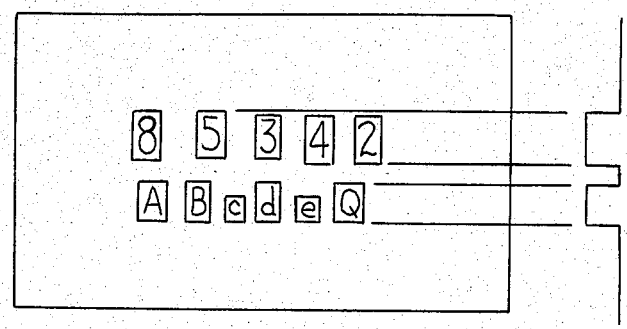
FIGS. 1(a) and 1(b) are schematic views showing a pattern containing characters on mail articles, and segmentation operations and, especially.
Figure 1B:
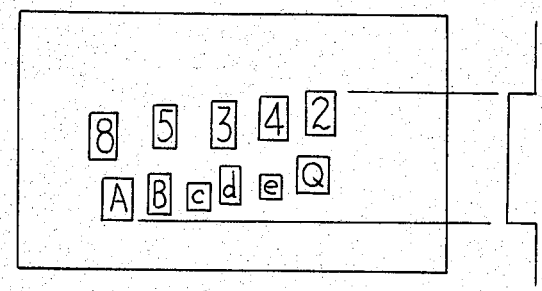

At the input of the shift register 11, a change from black to white, (i.e., from the block to the blank in the pattern signal t) is detected by the combination of the shift registers 20 and 21, an inverter 22 and an AND gate 23. The signal d, indicating the change from black to white, is supplied to memories as a write-in timing signal. At the output of the shift register 11, a change from white to black, (i.e., from the blank to the block in the compressed pattern signal r) is detected by the combination of the registers 30, 31 and an inverter 32, and an AND gate 33. The signal g indicating the change from white to black is supplied to the memories as a readout timing signal.

A character segmenting signal c is produced by the combination of registers 40, 41 and 45, an R-S flip-flop 42, an inverter 43, an AND gate 44 and an OR gate 46. In other words, the character segmenting signal c is detected under the condition that the pattern signal t, which is delivered from the OR gate 10, changes from black to white and that no block exists in the input pattern signal a. The R-S flip-flop 42 remembers whether or not the input pattern signal to be connected to an adjacent compressed block contains a block. Consequently, when no such block exists in the input pattern signal, the R-S flip-flop 42 is not set so that the output of the inverter 43 is "1". When the write-in timing signal d is produced, the character segmenting signal c is produced. The OR gate 46 performs an OR operation between the signal d, supplied through the one-bit register 45 and a signal h and supplies a reset signal i to the flip-flop 42. The signal h indicates the beginning of each process in the Y-direction. The shift register 45 is provided for resetting the flip-flop 42 immediately after a one bit shift in order to prepare for next character segmentation after the signal d is produced.

A gate 25 performs a logical AND operation between the output of the register 21 and the clock pulse SH. This gate 25 delivers a signal f which is used as the clock for a height counter (which will be explained below with reference to FIG. 5) for measuring the height of the segmented character. The output of the register 21 is inverted by an inverter 26 and changed into a reset signal e for the height counter.

Figure 4:
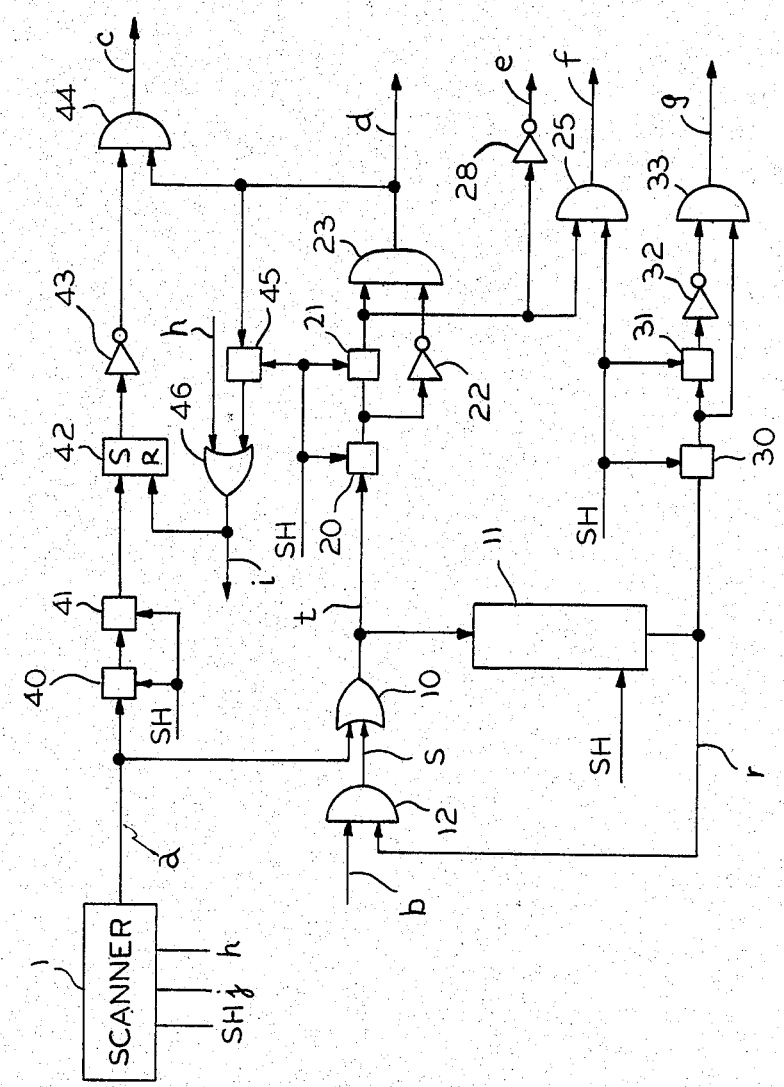
FIGS. 4 and 5 are block diagrams showing portions of an embodiment of the present invention.
Figure 5:
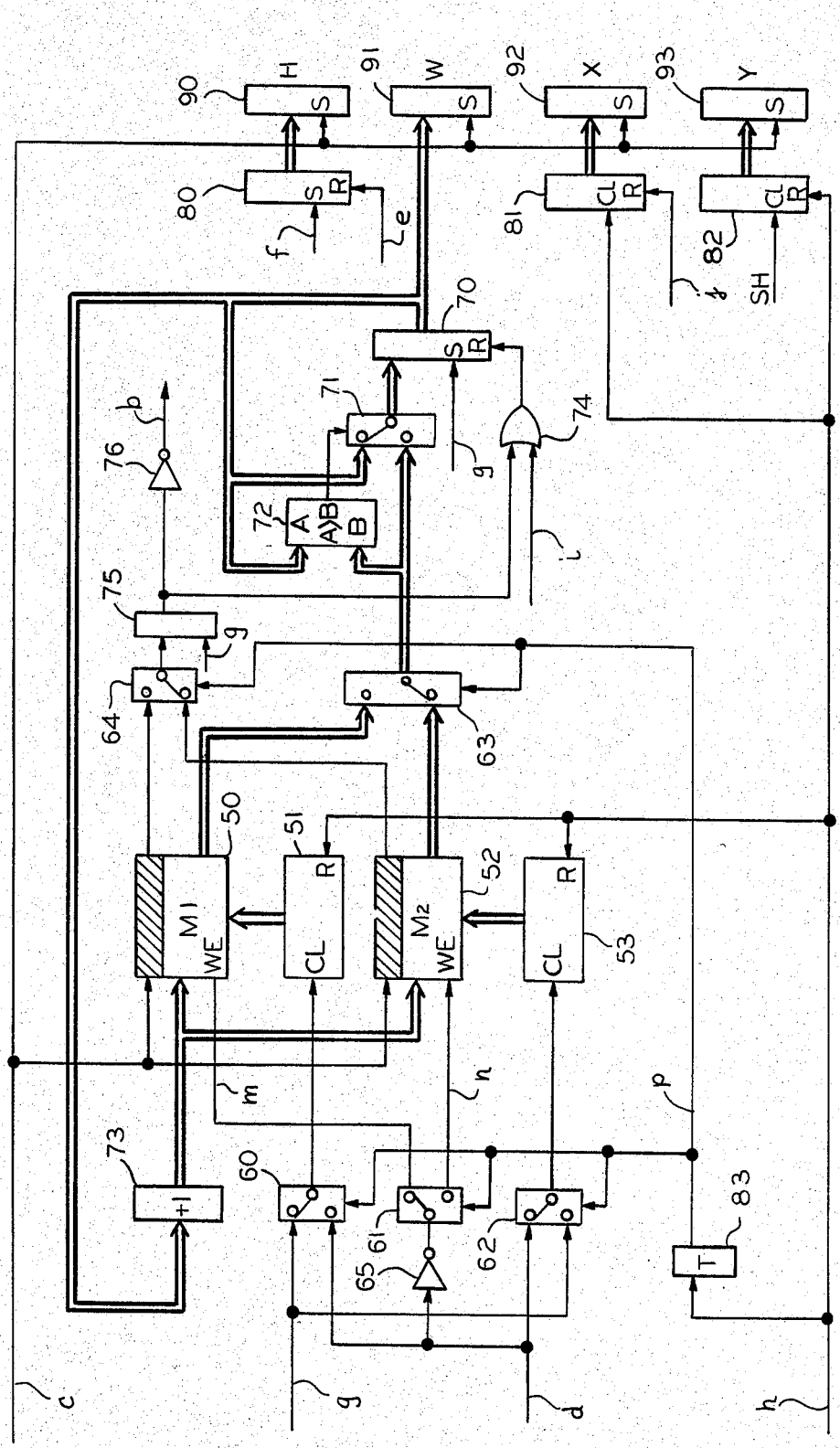

FIG. 5 shows the other part of the embodiment according to the present invention which receives signals produced in FIG. 4 and which develops the size information and position information of each segmented character. Two memories 50 and 52 (defined as $M_1$ and $M_2$, respectively) store the width (width in the X-direction) of the compression characters and the character segmenting signal c. These two memories $M_1$ and $M_2$ are alternatively switched over between the write-in operation and the read-out operation for each process line. Selectors 60, 61, 62, 63 and 64 perform the switching-over operation. The switching-over signal P can be obtained from a flip-flop 83, upon receiving the signal h as a clock pulse.

The memory capacity of each memory is determined in the following manner. The number of words stored in the memory must be the maximum number of characters that will be detected in one process line, and that number becomes maximum when white and black alternate in each mesh. This corresponds to $\frac{1}{2}$ of the mesh number of one process line. When one process line has 12 meshes, such as in the example shown in FIG. 3, six words are necessary and when one process line has 200 meshes, for example, 100 words are necessary. The memories store the width of the segmented character and one bit signal expressing the character segmenting signal c.

Figure 2:
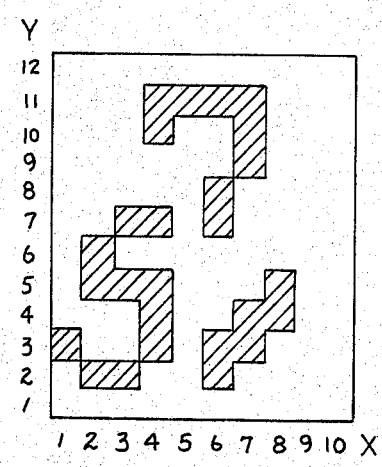
FIG. 2 shows an example of a character pattern on a mail article which is to be segmented by the present invention.

If the width information stored in the memories is formed by a binary code, the bit number which is capable of representing a full process line is necessary. In the example of FIG. 2, the number of process lines is ten so that four bits are necessary to store the width, and a total of five bits is necessary, including one bit for storing the character segmenting signal c. If one thousand process lines are to be scanned, for example, ten bits are necessary to store the full width ($1000 < 1024 = 2^{10}$). Hence, a word length of eleven bits in total is necessary, including one bit for storing the character segmenting signal c.

With respect to memories $M_1$ and $M_2$, address counters 51 and 53 are provided, respectively. The address counters 51 and 53 receives the signal d or g through the selector 60 or 62 as a clock pulse and the signal h as a reset pulse. To the memories $M_1$ and $M_2$, write enable signals m and n are supplied through the selector 61 which receives the signal d through an inverter 65. A symbol WE, in the memories $M_1$ and $M_2$, represents a write enable signal receiving terminal. Since the signals d and g are supplied to the address counters 51 and 53 in a non-inverted form and the signal d is supplied to the write enable signal receiving terminal of the memories $M_1$ and $M_2$ as a inverted form, write-in and read-out operations in the memories are effected at the leading edge of the signal d or g. The counting operations of the address counters 51 and 53 are effected at the trailing edge of the signal d or g. Consequently, the counting operations of the address counters are immediately effected after the write-in or read-out operation is effected.

The combination of a buffer register 70, a selector 71, a comparator 72, an adder 73 and an OR gate 74 is employed for producing the width information of each compressed block to be stored in the memory $M_1$ or $M_2$. Fundamentally, the value indicating the width read-out from the memory increases by one and the increased value is then written into the other memory. Initially, the value expressing "one" is stored in the memory, since the buffer register 70 is reset. In this embodiment, two memories are applied for enabling the write-in and read-out operations, at the same time. However, it is possible to use only one memory for both the write-in and read-out operations at the same time by dividing a memory area into a write-in operation area and a read-out operation area, which are designated by an address control.

Figure 3:
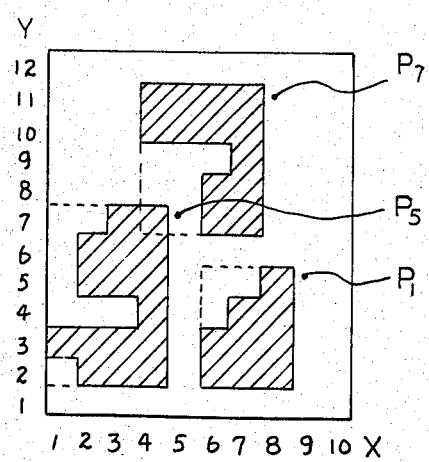
FIG. 3 is a diagram showing a compressed pattern which occurs when the character pattern shown in FIG. 2 is compressed according to the present invention.

In the process of compressing the character such as the character (5) in FIG. 3, two blocks are joined into one block when the process shifts from the third process line to the fourth process line. In other words, as to the character (5), the block having the width of two and the block having the width of three exist at the third line and these blocks turn into one block having the width of four at the fourth process line. The buffer register 70, the comparator 72 and the selector 71 are disposed to add one to reach the maximum width of the block during the process in which at least two blocks are joined into one block, in the abovementioned manner. The comparator 72 compares the value read out from the memory with the value that has previously been read out from the memory and set in the buffer register 70, and controls the selector 71 in order to select the greater value. Then, the selected greater value is soon set in the buffer register 70.

When the character segmentation is detected, the character segmenting signal c is also written into the one bit area (the oblique lined area) of the memory in addition to the width value of the compressed block. When the process shifts to the subsequent line, the character segmenting signal c is read-out from the memory by the signal g (i.e., at the edge of the corresponding compressed block) in addition to the width value. The read-out character segmenting signal c is supplied to the AND gate 12 (FIG. 4) through a selector 64, a register 75 and an inverter 76 as the block erasing signal b. On the other hand, the character segmenting signal c is also transmitted, as a set pulse, to buffer registers 90, 91, 92 and 93 which store the size information and the position information of the segmented character. A height counter 80 receives the signal f as a clock pulse and the signal e as a reset pulse. The counter 80 measures the height of the character and then the register 90 sets itself to store the height information "H" of the segmented character. The buffer register 70 sets the width of the character and then the buffer register 91 sets the width information "W" of the segmented character. An X-position counter 81 receiving the signal h as a clock pulse and a process start signal j as a reset pulse measures the X-position. Then, the buffer register 92 sets the X-position information "X". A Y-position counter 82 receives the shift clock pulse SH as a clock pulse and the signal h as a reset pulse measures the Y-position. Then, the buffer register 93 sets the Y-position information "Y". The process start signal j indicates the beginning of the whole process of the character segmentation.

Figure 6:
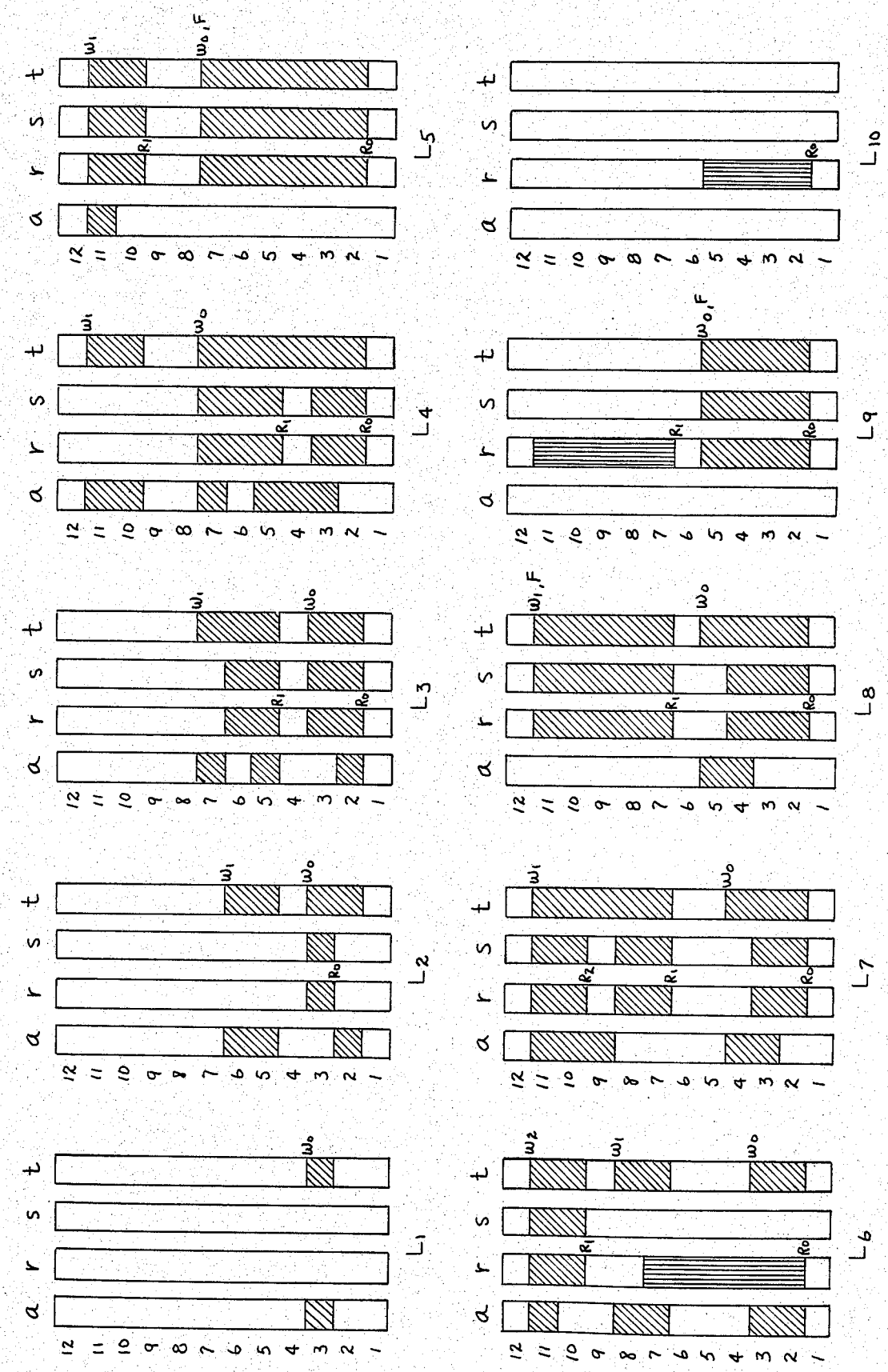
FIG. 6 is a diagram showing the processing sequence in the embodiment shown in FIG. 5.

Next, the process of the invention will be explained in detail, referring by way of example to the character pattern shown in FIG. 2. FIG. 6 illustrates blocks (black picture elements) in the input pattern signal a, the compressed pattern signal r delivered from the register 11, the remaining signal s delivered from the AND gate 12, and the added pattern signal t which is to be input to the register 11, as shown in FIG. 4. In this FIG. 6, lines $L_1$, $L_2$, ..., $L_{10}$ represent the pattern signals a, r, s and t of each vertical line in FIGS. 2 and 3 when the first, second, ... tenth lines in the pattern of FIG. 2 are, respectively, processed for the character segmentation. If the process for segmentation according to the present invention, is made from the bottom to the top in FIG. 2, each line in FIG. 6 is examined from the bottom to the top by comparing the input pattern signal with the compressed pattern signal. In FIG. 6, the symbols $W_0$, $W_1$ and $W_2$ represent points at which the write-in timing signal d is generated and the symbols $R_0$, $R_1$ and $R_2$ represent points at which the read-out timing signal g is generated. As regards these symbols, the suffixes 0, 1 and 2 indicate addresses of memories. The table shown in FIG. 7 illustrates the process performed in this embodiment according to the present invention and, especially, values written or read-out, in respect to the memories. Symbols ($W_0$) and ($W_1$) represent values written into the areas of the memory designated by the addresses "0" and "1", respectively. Such areas of the memory will be hereinafter described as, for example, the memory (address "0") and the memory (address "1"). Symbols ($R_0$) and ($R_1$) represent values read out from the memory (address "0") and memory (address "1"), respectively.

For odd numbered lines, it is assumed that the memory $M_1$ (FIG. 5) exclusively serves the writing operation and memory $M_2$ exclusively serves the reading operation at. For even-numbered lines, the memory $M_1$ exclusively serves the reading operation and memory $M_2$ exclusively serves in writing operation. The write-in and read-out timing signals d and g which control the memories are again explained as follows. The read-out timing signal g is generated when the composed pattern signal r, from the compression shift register 11, (FIG. 6), changes from white to black. This read-out timing is represented by $R_0$, $R_1$ and $R_2$ in FIG. 6. The write-in timing signal d is generated when the added pattern signal t changes from black to white. The added pattern signal t is the OR signal between the input pattern signal a and the compressed pattern signal s which is excluded by the block erasing signal b. This write-in timing is represented by $W_0$, $W_1$, and $W_2$. The values written into the memory are obtained by adding "one" to the value set in the buffer register 70, under control of the adder 73. The buffer register 70 is reset under the control of the signal i or the character segmenting signal read-out from the memory, i.e., the signal to be inverted to the block erasing signal b. The value read-out from the memory is set under the control of the read-out timing signal g.

Referring to FIGS. 6 and 7, in the first line $L_1$, the value "1" is written into the memory $M_1$ (FIG. 5) (address "0") at the point $W_0$.

In the second line $L_2$, the value "1" is read-out from the memory $M_1$ (address "0") at the point $R_0$ and set in the buffer register 70. Then, the value "2" is produced by the buffer register 70 and the adder 73 and is written into the memory $M_2$ (address "0") at the point $W_0$. The buffer register 70 is reset by the one-bit delayed timing after the the point $W_0$ and therefore, the value "1" is written into the memory $M_2$ (address "1") at the point $W_1$.

In the third line $L_3$, the value "2" is read-out from the memory $M_2$ (address "0") at the point $R_0$ and set in the register 70. Then, the value "3" is written into the memory $M_1$ (address "0") at the point $W_0$ and the register 70 is reset by the one-bit delayed timing after the point $W_0$. Next, the value "1" is read-out from the memory $M_2$ (address 1) at the point $R_1$ and the value "2" is written into the memory $M_1$ (address "1") at the point $W_1$.

In the fourth line $L_4$, the value "3" is read out from the memory $M_1$ (address "0") and set in the register 70 at the point $R_0$. After this, the register 70 is not reset by the point $R_1$ because the write-in timing signal d is not generated. The signal d is normally used for the reset pulse i by delaying one-bit (FIG. 4). Then, the value "2" is read-out from the memory $M_1$ (address "1") at the point $R_1$ and, therefore, the comparator 72 and the selector 71 select the greater value "3", which is set into the buffer register 70. By the way, this comparison is made whenever reading from the point $R_0$ in the line $L_2$ is effected. Since the buffer register 70 is always reset during the reading of the lines $L_2$ to $L_4$, the value read-out from the memory is selected and set into the buffer register 70. In the line $L_4$, the value "4" is written into the memory $M_2$ (address "0") at the point $W_0$. Since the buffer register 70 is reset immediately thereafter, the value "1" is written into the memory $M_2$ (address "1"), at the point $W_1$.

Next, the process in the fifth line $L_5$ will be explained. The value "4" is read-out from the memory $M_2$ (address "0") and set to the buffer register 70 at the point $R_0$. At the point $R_0$, the value "5" is written into the memory $M_1$ (address "0") and the character segmenting signal c is simultaneously generated because there is no block in the input pattern signal a, that corresponds to the compressed block from the point $R_0$ to the point $W_0$. A point F in FIGS. 6 and 7 shows the point that the character segmenting signal c is generated. Further, the character segmenting signal c indicated by one-bit is written into the respective area of the memory $M_1$ (address "0"). At the same time, the buffer registers 90, 91, 92 and 93 are set by the signal c.

In the fifth line $L_5$, the height counter 80 counts the number of meshes between the points $R_0$ and $W_0$, i.e., six, and the buffer register 90 stores the height value "6". The buffer register 91 stores the width value "4" delivered from the buffer register 70. The X-position counter 81 counts the number of scanned lines, i.e., five, and the buffer register stores the value "5". The Y-position counter 82 counts the number of meshes from the beginning of the line to the point $W_0$, i.e., seven, and the buffer register 93 stores the value "7". Accordingly, the character (5) is segmented and the size and position information $H(=6)$, $W(=4)$, $X(=5)$ and $Y(=7)$ are extracted. Since the group of buffer registers 90, 91, 92 and 93 are assumed to be temporary buffers, the information are transferred to another memory until segmentation of a next character is detected. It is also possible to employ memories instead of the buffer registers in which the information H, W, X and Y is stored. This information is stored in the areas of the memories which are designated by addresses, which are updated responsive to the character segmenting signal c.

Returning to the operation of the memories $M_1$ and $M_2$ in the line $L_5$, again, the value "5" is written into the memory $M_1$ (address "0") at the point $W_0$, but this value "5" will be reset in the sixth line $L_6$. The value "1" is read-out from the memory $M_2$ (address "1") at the point $R_1$ and the value "2" is written into the memory $M_1$ (address "1") at the point $W_1$. The process in the fifth line $L_5$ is completed.

Next, the process in the sixth line $L_6$ will be described. At the point $R_0$, the value "5" and the character segmenting signal c are read-out from the memory $M_1$ (address "0"). In this case, the value "5" in the buffer register 70 is reset responsive to the read out character segmenting signal applied through the OR gate 74 (FIG. 5). Further, the segmenting signal c which is read out of the memory $M_1$ is transmitted via a register 75 to an inverter 76 and is converted into the erasing signal b, which is supplied to the AND gate 12 for inhibiting the compressed pattern signal r (FIG. 4). Since the erasing signal b continues in its inhibiting state of "0", from the point $R_0$ to the point $R_1$ (FIG. 6), the compressed block (which is indicated by vertical hatching in the pattern r) is cleared as shown in the pattern s of line $L_6$. During this erasure, a block of the character (1) and blocks of the character (7) appear in the input pattern signal a. Therefore, the write-in timing signal d is generated at the points $W_0$, $W_1$ and $W_2$. The value "1" is written into the memory $M_2$ (addresses "0" and "1") at the points $W_0$ and $W_1$, respectively. The value "2" is read-out from the memory $M_1$ (address "1") at the point $R_1$ and the value "3" is written into the memory $M_2$ (address 2) at the point $W_2$.

When the segmentation process in the sixth line $L_6$ is finished, the compressed block corresponding to the character (5) is completely cleared and the information corresponding to the character (5) is also completely cleared. In other words, when the process in the line $L_6$ is completed, only the character (5) disappears from FIG. 2 and the subsequent process is carried out as if the character (5) had never existed, from the beginning. At this time, the segmentation information on the character (5) has been already extracted, of course. This operation constitutes the major characterizing feature of the present invention.

Process in the lines from the seventh line $L_7$ to the tenth line $L_{10}$ is carried out in the same way as shown in FIGS. 6 and 7. Consequently, the segmentation informations $H(=5)$, $W(=4)$, $X(=8)$ and $Y(=11)$ for the character (7) and that $H(=4)$, $W(=3)$, $X(=9)$ and $Y(=5)$ for the character (1) are obtained.

The foregoing description has been limited to a small scanning field of only three characters, such as shown in FIG. 2. Nevertheless, a greater scanning field and a greater number of characters can be processed in the same way.

The following are the principal features and effects of the present invention. (1) Extraction of the segmentation information is finished simultaneously with the end of scanning. (2) The size of the object for detection may range from one mesh up to the entire scanning field. (3) Even if the circumscribing squares of the characters overlap with one another, a sequential segmentation of these characters is possible and is performed so that the entire circumference of the circumscribing square of the character, previously segmented is white. (4) The response speed of the circuit is determined by the cycle time of the memories $M_1$ and $M_2$. If high speed memories are employed, therefore, the segmentation information can be obtained simultaneously with scanning. The input pattern signals may be delivered from a scanner as it is sampled and shifted at 10 MHz or more.

As described in the foregoing, the present invention makes it possible to have high speed processing that could never have been attained by a conventional compressing method without being affected by skew or non-uniformity of characters. The present invention also covers a vast range of objects to be detected, that can not be accomplished by a conventional mask method.

Although the foregoing description deals with the segmentation of the characters, it goes without special mention that the apparatus according to the present invention is applicable to the segmentation for figures other than characters.

What is claimed is:

1. A character segmenting apparatus comprising:
optical scanner means for producing a pattern signal by scanning a surface of an article, the scan being in a first direction which is substantially perpendicular to a second direction which is the direction of relative movement between said optical scanner means and said article;
means for recursively compressing said pattern signal delivered from said optical scanner means in said second direction to deliver a compressed pattern signal;
means for generating a character segmenting signal when no black picture element exists in a portion of said pattern signal which is delivered from said optical scanner means, said portion corresponding to a black picture element contained in an added pattern signal formed by adding said compressed pattern signal and said pattern signal delivered from said optical scanner means; and
means for obtaining information on size and position of a whole segmented character in response to said character segmenting signal.

2. A character segmenting apparatus comprising:
optical scanner means for producing a pattern signal by scanning a surface of an article with the scan being conducted in a first direction which is substantially perpendicular to a second direction corresponding to the relative movement between said optical scanner means and said article;
means responsive to said optical scanner means for recursively compressing said pattern signal in said second direction to deliver a compressed pattern signal;

means responsive to said compressing means for generating a character segmenting signal when no black picture element exists in a portion of said pattern signal which is delivered from said optical scanner means, said portion corresponding to a black picture element contained in an added pattern signal formed by adding said compressed pattern signal and said pattern signal delivered from said optical scanner means;

means for updating a width of a black picture element contained in said pattern signal in response to the operation of said compressing means;

height counting means for counting the height of a compressed black picture element contained in said compressed pattern signal;

first position counting means for counting scanning lines;

second position counting means for counting clock pulses used in said optical scanner means;

means for setting values delivered from said updating means, said height counting means, said first position counting means, and said second position counting means in response to said character segmenting signal; and means for erasing a segmented compressed black picture element in said compressed pattern signal delivered from said compressing means, said segmented compressed black picture element corresponding to a whole segmented character, after said character segmenting signal is generated.

3. A character segmenting apparatus comprising:

means for optically scanning a surface of an article and electrically converting images read by said scanning means into binary pattern signals;

register means having a capacity corresponding to one scanning line for compressing the pattern signals in a direction perpendicular to the scanning line while shifting said binary pattern signals in series to deliver a compressed pattern signal;

two memory means for temporarily storing a signal representing the width of each compressed black picture element contained in said compressed pattern signal and for temporarily storing a character segmenting signal;

means for alternately switching said two memory means between performing writing and reading operations, respectively, responsive to each line of scanning;

means for producing a write-in timing signal responsive to detecting a change from a black picture element to a blank in the pattern signals from said scanning means and said compressed pattern signal delivered from said register means;

means for producing a read-out timing signal responsive to detecting a change from a blank to a black picture element in said compressed pattern signal delivered from said register means;

means for producing said character segmenting signal when no black picture element exists in a portion of said binary pattern signals delivered from said scanning means, which portion corresponds to a black picture element contained in an added pattern signal formed by adding said compressed signal and said binary pattern signals; and;

means for erasing a segmented compressed black picture element contained in said compressed pattern signal delivered from said register means, said segmented compressed black picture element corresponding to a whole segmented character, after said character segmenting signal is produced.

4. A character segmenting apparatus comprising:

means for optically scanning a surface of an article and electrically converting images read by said scanning means into binary pattern signals;

register means having a capacity corresponding to one scanning line for compressing the binary pattern signals in a direction perpendicular to the scanning line while shifting said binary pattern signals in series to deliver a compressed pattern signal;

two memory means for temporarily storing a signal representing the width of each compressed black picture element contained in said compressed pattern signal and for temporarily storing a character segmenting signal;

means responsive to each line of scanning for alternately switching said two memory means between performing writing and reading operations, respectively;

means for producing a write-in timing signal responsive to detecting a change from a black picture element to a white element in the pattern signals by detecting a change from a black to a white picture element in said compressed pattern signal delivered from said register means;

means for producing a read-out timing signal responsive to detecting a change from a white to a black picture element in the compressed pattern signal delivered from said register means;

means for producing said character segmenting signal when no black picture element exists in a portion of the pattern signals delivered from said scanning means, said portion corresponding to a black picture element contained in an added pattern signal formed by adding said compressed signal and said binary pattern signals; and means for erasing a segmented compressed black picture element contained in the compressed pattern signals delivered from said register means, said segmented compressed black picture element corresponding to a whole segmented character, after said character segmenting signal is produced.

* * * * *